(12) United States Patent
Yu et al.

(10) Patent No.: US 10,263,293 B2
(45) Date of Patent: Apr. 16, 2019

(54) MANUFACTURING METHOD OF LITHIUM SECONDARY BATTERY

(71) Applicant: LG Chem, Ltd., Seoul (KR)

(72) Inventors: Sung Hoon Yu, Daejeon (KR); Yoo Sun Kang, Daejeon (KR); Kyung Mi Lee, Daejeon (KR)

(73) Assignee: LG Chem, Ltd. (KR)

( * ) Notice: Subject to any disclaimer, the term of this patent is extended or adjusted under 35 U.S.C. 154(b) by 610 days.

(21) Appl. No.: 14/908,883

(22) PCT Filed: Sep. 10, 2015

(86) PCT No.: PCT/KR2015/009527
§ 371 (c)(1),
(2) Date: Jan. 29, 2016

(87) PCT Pub. No.: WO2016/052881
PCT Pub. Date: Apr. 7, 2016

(65) Prior Publication Data
US 2016/0254572 A1    Sep. 1, 2016

(30) Foreign Application Priority Data

Sep. 30, 2014  (KR) .................. 10-2014-0131746
Sep. 2, 2015   (KR) .................. 10-2015-0124201

(51) Int. Cl.
*H01M 10/42*    (2006.01)
*H01M 10/052*   (2010.01)
(Continued)

(52) U.S. Cl.
CPC ..... *H01M 10/4235* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS

2004/0048163 A1*  3/2004  Park .................... H01M 10/052
                                               429/326
2005/0048367 A1*  3/2005  Igaki ................... H01M 4/0404
                                               429/212
(Continued)

FOREIGN PATENT DOCUMENTS

CN   101286578 A    10/2008
JP   2001052749 A   2/2001
(Continued)

OTHER PUBLICATIONS

KR 20050041513; Young, Chang Keun; published May 4, 2005; machine translation.*

(Continued)

*Primary Examiner* — Rena Dye Cronin
(74) *Attorney, Agent, or Firm* — Lerner, David, Littenberg, Krumholz & Mentlik, LLP

(57) ABSTRACT

Provided is a method of preparing a lithium secondary battery which may simultaneously improve output characteristics and lifetime characteristics of the lithium secondary battery by preparing an electrode on which an SEI film is formed through a pretreatment process, putting an electrode assembly including the electrode in a battery case, and injecting an electrolyte thereinto.

13 Claims, 4 Drawing Sheets

(51) Int. Cl.
*H01M 10/0567* (2010.01)
*H01M 10/058* (2010.01)
*H01M 4/04* (2006.01)
*H01M 4/133* (2010.01)
*H01M 4/505* (2010.01)
*H01M 4/525* (2010.01)
*H01M 10/0525* (2010.01)
*H01M 10/0568* (2010.01)
*H01M 10/0569* (2010.01)
*H01M 10/44* (2006.01)
*H01M 10/04* (2006.01)
*H01M 4/62* (2006.01)
*H01M 4/66* (2006.01)
*H01M 4/131* (2010.01)
*H01M 4/1391* (2010.01)
*H01M 4/02* (2006.01)

(52) U.S. Cl.
CPC ........ *H01M 4/0445* (2013.01); *H01M 4/133* (2013.01); *H01M 4/505* (2013.01); *H01M 4/525* (2013.01); *H01M 4/623* (2013.01); *H01M 4/625* (2013.01); *H01M 4/661* (2013.01); *H01M 10/049* (2013.01); *H01M 10/052* (2013.01); *H01M 10/058* (2013.01); *H01M 10/0525* (2013.01); *H01M 10/0567* (2013.01); *H01M 10/0568* (2013.01); *H01M 10/0569* (2013.01); *H01M 10/446* (2013.01); *H01M 4/131* (2013.01); *H01M 4/1391* (2013.01); *H01M 2004/027* (2013.01); *H01M 2004/028* (2013.01); *H01M 2220/20* (2013.01); *H01M 2220/30* (2013.01); *H01M 2300/0042* (2013.01)

(56) References Cited

U.S. PATENT DOCUMENTS

| | | |
|---|---|---|
| 2005/0191553 A1 | 9/2005 | Fujihara et al. |
| 2007/0059606 A1 | 3/2007 | Lee et al. |
| 2010/0024204 A1 | 2/2010 | Min et al. |
| 2010/0297510 A1 | 11/2010 | Kim et al. |
| 2011/0111306 A1 | 5/2011 | Park et al. |
| 2011/0159377 A1 | 6/2011 | Lee et al. |
| 2011/0159378 A1 | 6/2011 | Lee et al. |
| 2011/0200886 A1* | 8/2011 | Deguchi ............ H01M 4/133 429/331 |
| 2013/0252113 A1 | 9/2013 | Yu et al. |
| 2013/0266875 A1 | 10/2013 | Matsumoto et al. |
| 2014/0023920 A1* | 1/2014 | Yamazaki ............ H01M 4/133 429/211 |
| 2014/0045021 A1 | 2/2014 | Okutani et al. |
| 2014/0242453 A1 | 8/2014 | Lee et al. |
| 2014/0322579 A1* | 10/2014 | Mitsuhashi ......... H01M 2/362 429/94 |

FOREIGN PATENT DOCUMENTS

| | | | |
|---|---|---|---|
| JP | 2006294282 A | 10/2006 | |
| JP | 2007207650 A | 8/2007 | |
| JP | 2008-004424 A | 1/2008 | |
| JP | 2013110017 A | 6/2013 | |
| JP | 2013145732 A | 7/2013 | |
| JP | 2014035939 A | 2/2014 | |
| JP | 2014523101 A | 9/2014 | |
| KR | 10-2005-0041513 | 5/2005 | |
| KR | 20050041513 * | 5/2005 | ........... H01M 10/04 |
| KR | 10-2009-0021768 | 3/2009 | |
| KR | 10-2009-0106970 | 10/2009 | |
| KR | 100987377 B1 | 10/2010 | |
| KR | 10-2012-0106672 | 9/2012 | |
| KR | 10-2013-0134242 | 12/2013 | |
| KR | 20140108762 A | 9/2014 | |
| TW | 200816541 A | 4/2008 | |
| WO | 2012056765 A1 | 5/2012 | |
| WO | 2014092016 A1 | 6/2014 | |

OTHER PUBLICATIONS

JP 2008004424; Hideyuki, Yamamura; published Jan. 10, 2008; machine translation.*
International Search Report for Application No. PCT/KR2015/009527 dated Dec. 14, 2015.
Chinese Search Report for Application No. CN201580001586.6 dated May 15, 2017.
Extended Search Report from European Application No. 15821012.0, dated Aug. 29, 2017.

* cited by examiner

MANUFACTURING METHOD OF LITHIUM SECONDARY BATTERY

CROSS-REFERENCE TO RELATED APPLICATIONS

This application is a national phase entry under 35 U.S.C. § 371 of International Application No. PCT/KR2015/009527, filed Sep. 10, 2015, which claims priority to Korean Patent Application No. 10-2014-0131746, filed Sep. 30, 2014 and Korean Patent Application No. 10-2015-0124201, filed Sep. 2, 2015, the disclosures of which are incorporated herein by reference.

TECHNICAL FIELD

The present invention relates to a method of preparing a lithium secondary battery which may simultaneously improve output characteristics and lifetime characteristics of the lithium secondary battery.

BACKGROUND ART

Recently, in line with the development of information and telecommunications industry, electronic devices are being miniaturized, light-weighted, reduced in thickness, and portable. As a result, the need for high energy density batteries used as power sources of such electronic devices has increased. Currently, research into lithium secondary batteries, as batteries that may best satisfy the above need, has actively conducted.

A lithium secondary battery is a battery which is composed of a positive electrode, a negative electrode, and an electrolyte and a separator which provide movement paths of lithium ions between the positive electrode and the negative electrode, wherein electrical energy is generated by oxidation and reduction reactions that occur when lithium ions are stored in and released from the positive electrode and the negative electrode.

A lithium secondary battery has an average discharge voltage of about 3.6 V to about 3.7 V, and one of the advantages of the lithium secondary battery is that it has a higher discharge voltage than other alkaline batteries and a nickel-cadmium battery. In order to achieve such a high operating voltage, an electrolyte composition, which is electrochemically stable in a charge and discharge voltage range of 0 V to 4.2 V, is required.

Lithium ions released from a positive electrode active material, such as lithium metal oxide, during initial charging of a lithium secondary battery move to a negative electrode active material, such as a graphite-based material, to be intercalated into interlayers of the negative electrode active material. In this case, since lithium is highly reactive, lithium reacts with an electrolyte and carbon constituting the negative electrode active material on a surface of the negative electrode active material, such as a graphite-based material, to form a compound such as $Li_2CO_3$, $Li_2O$, or LiOH. These compounds may form a solid electrolyte interface (SEI) film on the surface of the negative electrode active material such as a graphite-based material.

The SEI film may only pass lithium ions by acting as an ion tunnel. Due to the effect of the ion tunnel, the SEI film may prevent the destruction of a negative electrode structure due to the intercalation of organic solvent molecules having a high molecular weight, which move with lithium ions in the electrolyte, into the interlayers of the negative electrode active material. Thus, it has been reported that the decomposition of the electrolyte does not occur by preventing the contact between the electrolyte and the negative electrode active material, and stable charge and discharge may be maintained by reversibly maintaining the amount of lithium ions in the electrolyte.

However, the SEI film of the lithium secondary battery may be unstable due to an additive or an organic solvent included in the electrolyte, and although the SEI film may be stably formed, gas may be generated due to the decomposition of the residual additive.

Even in a case of using an imide-based salt which may improve high-temperature storability and low-temperature output characteristics by minimizing an increase in viscosity of the organic solvent at low temperature and improving the mobility of the lithium ions, there is a significant limitation in using the lithium secondary battery due to the possibility of corrosion.

Thus, there is an urgent need to develop a method of improving output characteristics and lifetime characteristics of the lithium secondary battery while forming a robust and uniform SEI film and selectively selecting and using an electrolyte.

DISCLOSURE OF THE INVENTION

Technical Problem

The present invention provides a method of preparing a lithium secondary battery which may simultaneously improve output characteristics and lifetime characteristics of the lithium secondary battery by preparing an electrode on which an SEI film is formed through a pretreatment process, putting an electrode assembly including the electrode in a battery case, and injecting an electrolyte thereinto.

Technical Solution

According to an aspect of the present invention, there is provided a method of preparing a lithium secondary battery including: performing a pretreatment in which an SEI (solid electrolyte interphase) film is formed on an electrode by impregnating the electrode in a composition for forming an SEI film, which includes a lithium salt, a non-aqueous organic solvent, and an SEI film-forming agent capable of forming the SEI film by an electrochemical oxidation or reduction decomposition reaction, and applying a voltage to the electrode; and preparing an electrode assembly using the electrode having the SEI film formed thereon, putting the electrode assembly in a battery case, and performing an assembly process of electrolyte injection and charging one or more times.

According to another aspect of the present invention, there is provided a lithium secondary battery prepared by the above method.

According to another aspect of the present invention, there is provided a battery module including the lithium secondary battery as a unit cell and a battery pack including the battery module.

Particularities of other embodiments of the present invention are included in the following detailed description.

Advantageous Effects

According to a method of preparing a lithium secondary battery according to an embodiment of the present invention, output characteristics and lifetime characteristics of a lithium secondary battery may be further improved by forming an SEI film on an electrode in advance through a pretreatment of the electrode, putting an electrode assembly including the electrode having the SEI film formed thereon in a battery case, and stepwise injecting an electrolyte one or more times.

Also, an amount of an expensive additive used may be reduced by using only a small amount of the additive required for the formation of the SEI film in a pretreatment step, the release of a gas generated in the battery case may be facilitated, and various electrolytes may be selectively used by the stepwise injection of the electrolyte. Thus, the performance of the lithium secondary battery may be further improved by overcoming limitations due to the typical use of a lithium salt and an additive.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a lithium secondary battery according to an embodiment of the present invention includes: performing a pretreatment in which an SEI film is formed on an electrode by impregnating the electrode in a composition for forming an SEI film, which includes a lithium salt, a non-aqueous organic solvent, and an SEI film-forming agent forming the SEI film by an electrochemical oxidation-reduction decomposition reaction, and applying a voltage to the electrode (step I); and preparing an electrode assembly using the electrode having the SEI film formed thereon, putting the electrode assembly in a battery case, and performing a process of electrolyte injection and charging one or more times (step II).

According to the method of preparing a lithium secondary battery according to the embodiment of the present invention, output characteristics and lifetime characteristics of a lithium secondary battery may be further improved by forming an SEI film on an electrode in advance through a pretreatment of the electrode, putting the electrode having the SEI film formed thereon in a battery case, and stepwise injecting an electrolyte one or more times.

Also, an amount of an expensive additive used may be reduced by using only a small amount of the additive required for the formation of the SEI film in the pretreatment step, the release of a gas generated in the battery case may be facilitated, and various electrolytes may be selectively used by the stepwise injection of the electrolyte. Thus, the performance of the lithium secondary battery may be further improved by overcoming limitations due to the typical use of a lithium salt and an additive.

Figure 1:
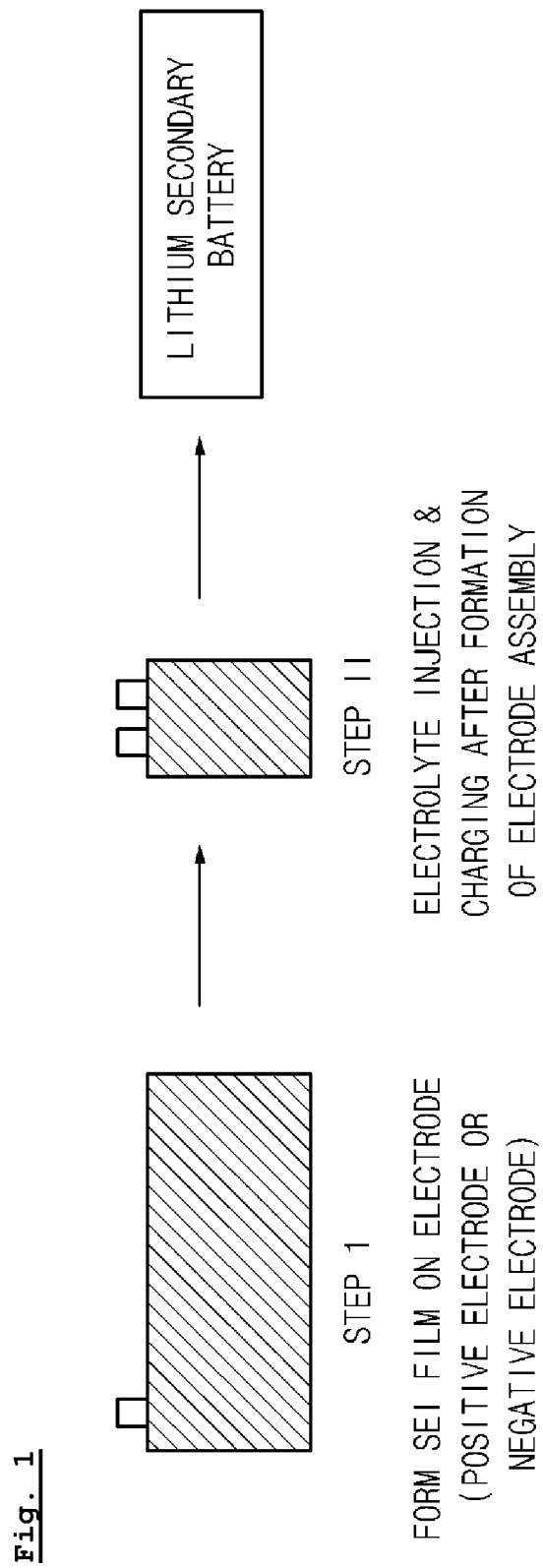
FIG. 1 is a flowchart illustrating a method of preparing a lithium secondary battery according to an embodiment of the present invention.

FIG. 1 is a flowchart illustrating the method of preparing a lithium secondary battery according to the embodiment of the present invention. However, FIG. 1 is only an example for describing the present invention and the present invention is not limited thereto.

Hereinafter, the present invention will be described in more detail for each step with reference to FIG. 1. In the method of preparing a lithium secondary battery according to the embodiment of the present invention, step I, as a pretreatment step for preparing a secondary battery, may include forming an SEI film on an electrode using a composition for forming an SEI film.

That is, step I is a step of forming an SEI film on a positive electrode or a negative electrode by putting the electrode, i.e., the positive electrode or the negative electrode, in a composition for forming an SEI film, which includes an SEI film-forming agent capable of easily forming the SEI film due to good wettability with respect to an electrolyte as well as forming the SEI film by an electrochemical oxidation or reduction decomposition reaction, and applying a voltage to perform the electrochemical reaction.

In general, since an electrode used in a lithium secondary battery is strongly lipophilic, the electrode has poor wetting with an electrolyte having a hydrophilic property. In a case where activation of the battery is performed in a state in which the electrolyte does not sufficiently wet the electrode, since an SEI film is not properly formed on the electrode, the lifetime characteristics of the battery may be degraded.

In the present invention, since the electrode pretreatment is performed by using the composition for forming an SEI film which may improve the wetting with the electrolyte, an SEI film may be sufficiently formed on the electrode in advance due to the good wettability.

The composition for forming an SEI film is not particularly limited so long as it is a solution including a compound which may form the SEI film on the electrode, and may specifically include an SEI film-forming agent, a lithium salt, and a non-aqueous organic solvent.

The lithium salt usable in the preparation of the composition for forming an SEI film is a source of lithium ions, wherein the lithium salt may be used without particular limitation as long as it is a compound capable of providing lithium ions. Specific examples of the lithium salt may be $LiPF_6$, $LiAsF_6$, $LiCF_3SO_3$, $LiBF_4$, $LiBF_6$, $LiSbF_6$, $LiAlO_4$, $LiAlCl_4$, $LiSO_3CF_3$, or $LiClO_4$, and any one thereof or a mixture of two or more thereof may be used.

Also, the lithium salt may be included in a concentration of 0.5 mol/l to 2 mol/l in the composition for forming an SEI film. In a case in which the concentration of the lithium salt is less than 0.5 mol/l, an amount of lithium ions provided is not sufficient, and in a case in which the concentration of the lithium salt is greater than 2 mol/l, since viscosity of the composition for forming an SEI film may be increased, formability of the SEI film may be reduced. When considering conductivity of the lithium ions in the SEI film and the formability of the SEI film, the lithium salt, for example, may be included in a concentration of 0.5 mol/l to 1.6 mol/l in the composition for forming an SEI film.

Typically, an SEI film may also be formed by an electrochemical oxidation-reduction reaction of an electrolyte including a lithium salt and a non-aqueous organic electrolyte. However, the SEI film formed by the decomposition of the non-aqueous organic electrolyte is thick and has a high resistance.

In contrast, in the present invention, since a thickness of the formed SEI film is reduced but density is increased by using an additive for forming an SEI film, an SEI film having improved properties may be formed, for example, resistance in the SEI film is decreased.

In the method of preparing a lithium secondary battery according to the embodiment of the present invention, the SEI film-forming agent usable in the preparation of the composition for forming an SEI film, as a compound capable of forming the SEI film by an electrochemical oxidation or reduction decomposition reaction, may specifically include a cyclic carbonate-based compound containing an unsaturated bond; a cyclic or chain carbonate-based compound containing a halogen atom; a lithium salt containing an oxalato complex as an anion; an imide-based lithium salt; a fluorophosphate-based lithium salt; a fluoroborate-based lithium salt; a 6-membered aromatic heterocyclic compound containing at least two nitrogen atoms in a molecule; a sultone-based compound; or an acrylate-based compound, and any one thereof or a mixture of two or more thereof may be used. Unless otherwise specified in the present invention, the SEI film-forming agent is a compound different from a lithium salt and a non-aqueous organic solvent used in the preparation of the composition for forming an SEI film and described below.

In the SEI film-forming agent, the cyclic carbonate-based compound containing an unsaturated bond may specifically be a vinylene carbonate-based compound such as vinylene carbonate, methyl vinylene carbonate, ethyl vinylene carbonate, propyl vinylene carbonate, dimethyl vinylene carbonate, or vinylene ethylene carbonate; or a vinyl ethylene carbonate-based compound, such as vinyl ethylene carbonate, and any one thereof or a mixture of two or more thereof may be used.

Also, in the SEI film-forming agent, the cyclic or chain carbonate-based compound containing a halogen atom may specifically be a cyclic carbonate-based compound containing at least one halogen atom in a molecule such as fluoroethylene carbonate or difluoroethylene carbonate; and a chain carbonate-based compound containing at least one halogen atom in a molecule such as fluoromethyl methyl carbonate or bis(fluoromethyl)carbonate, and any one thereof or a mixture of two or more thereof may be used.

Furthermore, in the SEI film-forming agent, as the lithium salt containing an oxalato complex as an anion, any lithium salt may be used without limitation as long as an anionic compound containing an oxalate group and lithium ions form a complex through coordination bonds. Specific examples of the lithium salt containing an oxalato complex as an anion may be lithium difluoro(oxalato)borate (LiODFB), lithium tetrafluoro(oxalato) phosphate (LiTFOP), lithium tris(oxalate)phosphate (LTOP), or lithium bis(oxalato)borate (LiBOB), and any one thereof or a mixture of two or more thereof may be used.

In the SEI film-forming agent, an imide-based lithium salt such as lithium bisfluorosulfonyl imide (LiFSI), lithium bis trifluoromethanesulfonyl imide (LiTFSI), or lithium bis(perfluoroethylsulfonyl)imide (LiBETI); and a fluorophosphate-based lithium salt, such as $LiBF_4$, lithium difluorophosphate ($LiF_2O_2P$), or lithium monofluorophosphate ($Li_2PO_3F$), may be used as the lithium salt for forming an SEL film in addition to the lithium salt containing an oxalato complex as an anion, and the above compounds may be used alone or in a mixture of two or more thereof.

The lithium salt containing an oxalato complex as an anion, the imide-based lithium salt, or the fluorophosphate-based salt, which may be used as the SEI film-forming agent, may also be used as the lithium salt in the composition for forming an SEI film. In this case, the lithium salt containing an oxalato complex as an anion, the imide-based lithium salt, or the fluorophosphate-based salt may be included in an amount in which a total concentration of the lithium salt included in the composition for forming an SEI film simultaneously satisfies a condition of lithium salt concentration in the composition for forming an SEI film and a condition of the amount of the SEI film-forming agent.

Also, in the SEI film-forming agent, the 6-membered aromatic heterocyclic compound containing at least two nitrogen atoms in a molecule may specifically be pyrimidine and 1,3,5-triazine, and any one thereof or a mixture of two or more thereof may be used.

Furthermore, in the SEI film-forming agent, the sultone-based compound may specifically be 1,3-propane sultone (PS), 1,4-butane sultone, or 1,3-propene sultone, and any one thereof or a mixture of two or more thereof may be used.

The SEI film-forming agent may be included in an amount of 0.1 wt % to 10 wt % based on a total weight of the composition for forming an SEI film. When the amount of the SEI film-forming agent is within the above range, a uniform and thin film derived from the additive for forming an SEI film may be formed on the electrode after the electrical reaction, and an amount of a gas generated by charging may be minimized. Also, when considering an effect of improving physical properties of the SEI film formed according to the use of the SEI film-forming agent, the SEI film-forming agent may specifically be included in an amount of 0.25 wt % to 5 wt %, for example, 0.5 wt % to 3 wt %, based on the total weight of the composition for forming an SEI film.

In the composition for forming an SEI film, the non-aqueous organic solvent functions as a medium through which ions involved in the electrochemical reaction may move, wherein any non-aqueous organic solvent, which may be minimally decomposed by an oxidation reaction or the like during charging and discharging of the battery and may exhibit desired characteristics with the SEI film-forming agent, may be appropriate.

Specifically, the non-aqueous organic solvent may be a cyclic carbonate-based solvent such as ethylene carbonate (EC), propylene carbonate (PC), and butylene carbonate (BC); a linear carbonate-based solvent such as dimethyl carbonate (DMC), diethyl carbonate (DEC), dipropyl carbonate (DPC), ethylmethyl carbonate (EMC), methylpropyl carbonate (MPC), and ethylpropyl carbonate (EPC); an ester-based solvent such as methyl acetate, ethyl acetate, γ-butyrolactone, and ε-caprolactone; an ether-based solvent such as dibutyl ether or tetrahydrofuran; or a ketone-based solvent, such as cyclohexanone, and any one thereof or a mixture of two or more thereof may be used. Among the above solvents, the organic solvent may be a mixture of cyclic carbonate and linear carbonate in consideration of the formability of the SEI film, and, for example, may be a mixture in which the linear carbonate is mixed in a larger amount than the cyclic carbonate. Specifically, a mixing volume ratio of the linear carbonate to the cyclic carbonate may be in a range of 5:5 to 8:2.

The non-aqueous organic solvent may be included in such an amount that the composition for forming an SEI film has a viscosity which facilitates the formation of the SEI film.

The electrode pretreated by the composition for forming an SEI film may be a positive electrode or a negative electrode.

Specifically, in a case in which the electrode is a positive electrode, the usable positive electrode may include a structure in which a positive electrode active material layer is stacked on a current collector such as a thin film formed of aluminum or an aluminum-based alloy. In this case, the positive electrode active material layer may include a positive electrode active material, a conductive agent, and a binder, and the positive electrode active material and the conductive agent may be stacked on the current collector by the binder.

The positive electrode active material is a compound (lithiated intercalation compound) capable of reversibly intercalating and deintercalating lithium, wherein the positive electrode active material may specifically be a lithium transition metal oxide including lithium and a transition metal such as cobalt, manganese, nickel, or aluminum. Furthermore, the lithium transition metal oxide may be selected form the group consisting of lithium-nickel-manganese-cobalt-based oxide, lithium-manganese-based oxide, lithium-nickel-manganese-based oxide, and lithium-manganese-cobalt-based oxide, and, for example, may include $LiCoO_2$, $LiNiO_2$, $LiMnO_2$, $LiMn_2O_4$, $Li(Ni_aCo_bMn_c)O_2$ (where $0<a<1, 0<b<1, 0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $Li(Ni_aCo_bMn_c)O_4$ (where $0<a<2, 0<b<2, 0<c<2$, and $a+b+c=2$), $LiMn_{2-z}Ni_zO_4$, and $LiMn_{2-z}Co_zO_4$ (where $0<z<2$).

Also, in a case in which the electrode is a negative electrode, the usable negative electrode like the positive electrode may include a structure in which a negative electrode active material layer is stacked on a current collector. In this case, in the negative electrode active material layer, a negative electrode active material and a conductive agent may be stacked on the current collector by a binder.

The negative electrode active material is a compound capable of reversibly intercalating and deintercalating lithium, wherein specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ ($0<x<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In the positive electrode and the negative electrode, the current collector is not particularly limited so long as it has conductivity without causing adverse chemical changes in the batteries, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, the current collector may have a fine roughness surface to improve bonding strength with a negative electrode active material, and the current collector may have various shapes such as a film, a sheet, a foil, a net, a porous body, a foam body, a non-woven fabric body, and the like.

The conductive agent used in the positive electrode or negative electrode active material layer may be added in an amount of 1 wt % to 20 wt % based on a total weight of the positive electrode or negative electrode active material layer. Any conductive agent may be used as the conductive agent usable in the positive electrode and the negative electrode without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder used in the positive electrode or negative electrode active material layer is a component that assists the binding between the positive electrode or negative electrode active material and the conductive agent, and the binding with the current collector, wherein the binder may be added in an amount of 1 wt % to 20 wt % based on the total weight of the positive electrode or negative electrode active material layer. Examples of the binder may be a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, or various copolymers, and any one thereof or a mixture of two or more thereof may be used.

The positive electrode and the negative electrode may be prepared by coating the current collector with a composition for forming an electrode, in which each electrode active material, conductive agent, and binder are dispersed in a solvent, and then drying the coated current collector, or may be prepared by casting the composition for forming an electrode on a separate support and then laminating a film separated from the support on the current collector. In this case, specific examples of the solvent may be dimethyl sulfoxide (DMSO), alcohol, N-methyl pyrrolidone (NMP), acetone, or water, and the solvent may be removed in a subsequent drying process.

In the method of preparing a lithium secondary battery according to the embodiment of the present invention, the formation of the SEI film using the composition for forming an SEI film having the above-described composition may be performed by impregnating the electrode in the composition for forming an SEI film and then applying a voltage. In this case, the voltage application process may be performed by applying a voltage within a range in which the electrochemical oxidation-reduction decomposition reaction of the SEI film-forming agent may occur, and may specifically performed by applying a voltage of 0.005 V to 4.5 V using the electrode and its counter electrode.

With respect to the positive electrode, the voltage application process may be performed by applying a voltage of 1 V to 4.5 V, for example, 2 V to 4.2 V, for about 1 hour to 24 hour. Also, with respect to the negative electrode, the voltage application process may be performed by applying a voltage of 0.005 V to 4.5 V, for example, 0.01 V to 4.0 V, for about 1 hour to 24 hour.

Also, in a case in which the positive electrode is used as the electrode, a lithium metal foil may be used as its counter electrode, and in a case in which the negative electrode is used as the electrode, copper may be used as its counter electrode, but the present invention is not limited thereto.

In the electrode pretreatment process as described above, a positive electrode or negative electrode on which an SEI film is formed may be prepared by putting the positive electrode or negative electrode in a bath and performing an electrical reaction, and, as another example, a positive electrode or negative electrode on which an SEI film is formed may be prepared by respectively putting the positive electrode and negative electrode in two different baths and performing an electrochemical reaction.

In a case in which the SEI film is formed on a surface of the electrode active material in the bath by the pretreatment method as described above, the release of the generated gas is facilitated in comparison to a typical case in which an SEI film is formed in a battery case. For example, with respect to a stacked type electrode or jelly-roll type electrode, since gas may be trapped in the middle of the electrodes by the electrodes in contact with each other, the gas may not be easily discharged. In contrast, in the case that the electrode is primarily put in a bath and an SEI film is formed only on a cross-section of the electrode according to the embodiment of the present invention, since a space may be secured in a gas generating direction, all of the gas may be discharged without being trapped in the middle.

Also, according to the method of preparing a lithium secondary battery according to the embodiment of the present invention, since the generation of the gas and the amount of the additive used may be reduced, a degassing process and a resealing process, which are generally used, may be omitted. Thus, the method may be superior in terms of the simplicity and ease of the process.

Next, in the method of preparing a lithium secondary battery according to the embodiment of the present invention, step II may include putting an electrode assembly including the electrode (e.g., the positive electrode or the negative electrode, or the positive electrode and the negative electrode) having the SEI film formed thereon in a battery case, and performing a combination process of electrolyte injection and charging one or more times.

Specifically, a first electrolyte may be injected into the battery case in which the electrode assembly including the positive electrode and/or the negative electrode having the SEI film formed thereon, which is obtained in step I, and a separator disposed therebetween are accommodated.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or may be used by laminating two or more layers thereof as the separator. Also, a typical porous nonwoven fabric, for example, a nonwoven fabric formed of high melting point glass fibers or polyethylene terephthalate fibers may be used, but the present invention is not limited thereto.

According to the method of preparing a lithium secondary battery according to the embodiment of the present invention, the electrode assembly may be any one selected from the group consisting of a jelly-roll type, a stacked type, or a stack and folding type.

Also, any battery case typically used in the art may be selected as the battery case used in the present invention. A shape of the battery case according to the use of the battery is not limited, and for example, a cylindrical type using a can, a prismatic type, a pouch type, or a coin type may be used.

According to an embodiment of the present invention, since the positive electrode and/or the negative electrode having the SEI film formed thereon, which is obtained in step I, may be unstable in water, it is desirable to prepare a battery cell in an environment that avoids contact with air, but the present invention is not limited thereto.

According to an embodiment of the present invention, when the process of charging after the injection of the electrolyte is referred to as one cycle, the combination process of electrolyte injection and charging may be performed one time, or may be performed twice or more, particularly, a plurality of times such as two to three times. For example, the combination process of electrolyte injection and charging may be performed one to three times, or one or two times.

In a case in which the combination process of electrolyte injection and charging is performed one time, step II including the process of electrolyte injection and charging may include a first injection step of preparing a battery cell by injecting a first electrolyte into the battery case; and a first charging step of charging the battery cell.

Also, in a case in which the combination process of electrolyte injection and charging is performed twice according to another embodiment of the present invention, step II may include a first injection step of preparing a battery cell by injecting a first electrolyte into the battery case; a first charging step of charging the battery cell; a second injection step of injecting a second electrolyte into the charged battery cell; and a second charging step of charging the battery cell into which the second electrolyte is injected.

Also, according to an embodiment of the present invention, the same solution as the composition for forming an SEI film may be used as the electrolyte for each step, such as the first electrolyte and the second electrolyte, or different solutions may be used.

For example, according to an embodiment of the present invention, in a case in which the combination process of electrolyte injection and charging is performed on the battery case, which includes the electrode having the SEI film formed thereon, in step II, an additive required for the formation of the SEI film may not be used in the first electrolyte. The additive may be effective in the formation of the SEI film but may also be a cause of the generation of the gas due to the decomposition when the additive remains.

Since the SEI film is already formed on the electrode, a limitation due to the generation of the gas may be addressed by not using the additive in the first electrolyte. Thus, since only a small amount of the expensive additive may be used during the pretreatment, the amount of the additive used may be reduced.

Also, in the case in which the combination process of electrolyte injection and charging is performed one time in step II, lithium salt and non-aqueous organic solvent used are not particularly limited and the above-described lithium salt and non-aqueous organic solvent may be selectively used.

Furthermore, according to an embodiment of the present invention, in the case the combination process of electrolyte injection and charging is performed one or more times in step II, a lithium salt for corrosion protection, which may prevent the corrosion of an electrode current collector, for example, Al, may be used as the lithium salt. The first electrolyte may include at least one lithium salt for corrosion protection selected from the group consisting of $LiPF_6$, $LiAsF_6$, $LiCF_3SO_3$, $LiBF_4$, $LiBF_6$, $LiSbF_6$, $LiAlO_4$, $LiAlCl_4$, $LiSO_3CF_3$, and $LiClO_4$, and may, for example, include one selected from the group consisting of $LiPF_6$ and $LiBF_4$, or a mixture of two or more thereof.

In a case in which an electrolyte including the lithium salt for corrosion protection, for example, $LiPF_6$, is leaked to an aluminum layer, the $LiPF_6$ included in the electrolyte may also be in contact with the current collector, for example, the aluminum layer. The $LiPF_6$ in contact with the aluminum layer as described above may be in contact with the aluminum layer in a state in which a voltage is applied to the aluminum layer, and, in this case, the Al and fluorine (F) may cause an electrochemical reaction to form an $AlF_3$ film. The $AlF_3$ film is a layer which is well known to have strong corrosion resistance, wherein, in the case that the electrolyte is leaked to the aluminum layer in the state in which the above-described voltage application condition is satisfied, the $AlF_3$ film is formed on the leaked area or interface. The $AlF_3$ film thus formed, as a corrosion-resistant layer, may prevent the corrosion of the aluminum layer due to the exposure to the electrolyte and may function as a protective layer which prevents the occurrence of a swelling phenomenon.

Also, the non-aqueous organic solvent, which may be included in the first electrolyte, is not limited as long as it may minimize the decomposition due to the oxidation reaction or the like during the charging and discharging of the battery and may exhibit desired characteristics with the additive. For example, the non-aqueous organic solvent may include carbonate, ester, ether, or ketone. These materials may be used alone or in the form of a mixture in which two or more thereof are mixed.

Among these materials, the organic solvent, for example, may be a carbonate-based organic solvent. For example, the carbonate-based organic solvent may include cyclic carbonate such as ethylene carbonate (EC), propylene carbonate (PC), or butylene carbonate (BC); or chain carbonate such as dimethyl carbonate (DMC), diethyl carbonate (DEC), dipropyl carbonate (DPC), ethylmethyl carbonate (EMC), methylpropyl carbonate (MPC), or ethylpropyl carbonate (EPC), and any one thereof or a mixture of two or more thereof may be used.

Also, the organic solvent may be an ester-based solvent. The ester-based solvent, for example, may include methyl formate, methyl acetate, ethyl acetate, isopropyl acetate, isoamyl acetate, methyl propionate, ethyl propionate, methyl butyrate, or ethyl butyrate, and any one thereof or a mixture of two or more thereof may be used.

According to an embodiment of the present invention, a concentration of the lithium salt in the first electrolyte may be in a range of 0.8 M to 2.5 M, and an amount of the first electrolyte used may be in a range of 5 vol % to 70 vol %, particularly, 10 vol % to 30 vol %, based on a total volume of the injected electrolyte.

Also, according to an embodiment of the present invention, the first electrolyte may further include an additive, such as sulfonic acid ester, in order to improve the stability of the lithium secondary battery.

Examples of the sulfonic acid ester may be 1,3-propane sultone, 1,4-butane sultone, or 2,4-butane sultone, and any one thereof or a mixture of two or more thereof may be used. Also, a cyclic disulfonic acid ester having two sulfonyl groups may be used as the sulfonic acid ester, and the cyclic disulfonic acid ester having two sulfonyl groups may be used alone or in a mixture with the above-described sulfonic acid ester.

According to an embodiment of the present invention, in a case in which the first electrolyte includes the sulfonic acid ester, a sulfonic acid ester derived film may be formed on the electrode by the charging of the first charging process. In this case, when lithium manganese oxide, for example, is used as the positive electrode active material, dissolution of manganese in an electrolyte layer due to the charging and discharging of the battery may be suppressed.

An amount of the sulfonic acid ester additive used may be in a range of 0.01 wt % to 10 wt %, particularly, 0.05 wt % to 6 wt %, based on 100 wt % of the first electrolyte. When the amount of the sulfonic acid ester used is within the above range, since the uniform and thin sulfonic acid ester derived film may be formed on the electrode layer, specifically, the electrode having the SEI film formed thereon which is obtained in step I, after the first charging, the lifetime characteristics of the lithium secondary battery may be further improved. In particular, according to an embodiment of the present invention, the SEI layer is formed in step I, and the sulfonic acid ester derived film may then be formed after the first charging step of step II. In this case, since the generation of gas during the first charging may be suppressed, an excellent lithium secondary battery having high stability may be obtained.

In addition, a vinyline-based additive for improving lifetime; a nitrile-based additive for improving stability, for example, suppression of swelling, overcharging, and overdischarging, suppressing low voltage, and improving lifetime; a phosphate-based additive suitable for a high-voltage electrolyte due to a high oxidation voltage and for improving lifetime or output; and a HF scavenger having a functional group capable of removing HF, such as an O—Si bond, may further be used.

The nitrile-based additive, for example, may be one selected from the group consisting of succinonitrile, adiponitrile, glutaronitrile, acetonitrile, and 2-methylglutaronitrile, or a mixture of two or more thereof, and, for example, alkyl fluoro phosphates may be used as the phosphate-based additive. These additives may also be used as a solvent in the second electrolyte.

Also, according to another embodiment of the present invention, in the case in which the combination process of electrolyte injection and charging is performed only one time, i.e., the second injection step and the second charging step are not performed, the first electrolyte may include the lithium salt for corrosion protection, the non-aqueous organic solvent, and the additive if necessary.

According to an embodiment of the present invention, as an advantage of an imide-based lithium salt, the output characteristics and lifetime characteristics of the lithium secondary battery may be improved by injecting the first electrolyte including the imide-based lithium salt.

Specific examples of the imide-based lithium salt may be lithium bis(fluorosulfonyl)imide (LiFSI), lithium bis(trifluoromethanesulfonyl)imide (LiTFSI), or lithium bis(perfluoroethylsulfonyl)imide (LiBETI), and any one thereof or a mixture of two or more thereof may be used. For example, the imide-based lithium salt may include LiFSI.

Also, according to the preparation method according to the embodiment of the present invention, in the case in which the combination process of electrolyte injection and charging is performed twice or more, the performance of the lithium secondary battery may be further improved by using different types of the first electrolyte and the second electrolyte. For example, an electrolyte including the lithium salt for corrosion protection may be used as the first electrolyte and a lithium salt for improving the performance of the battery may be used as the second electrolyte.

According to an embodiment of the present invention, an anti-corrosion film may be stably formed on the surface of the current collector, for example, the surface of the current collector between the active material and the active material, by performing the first charging step (first activation step) using the electrolyte including the lithium salt for corrosion protection as the first electrolyte. The output characteristics as well as the lifetime characteristics of the lithium secondary battery may be simultaneously improved by injecting the second electrolyte including the lithium salt for improving the performance of the battery as the second electrolyte in the state in which the anti-corrosion film is stably formed as described above, and then performing the second charging step (second activation step).

Figure 2:
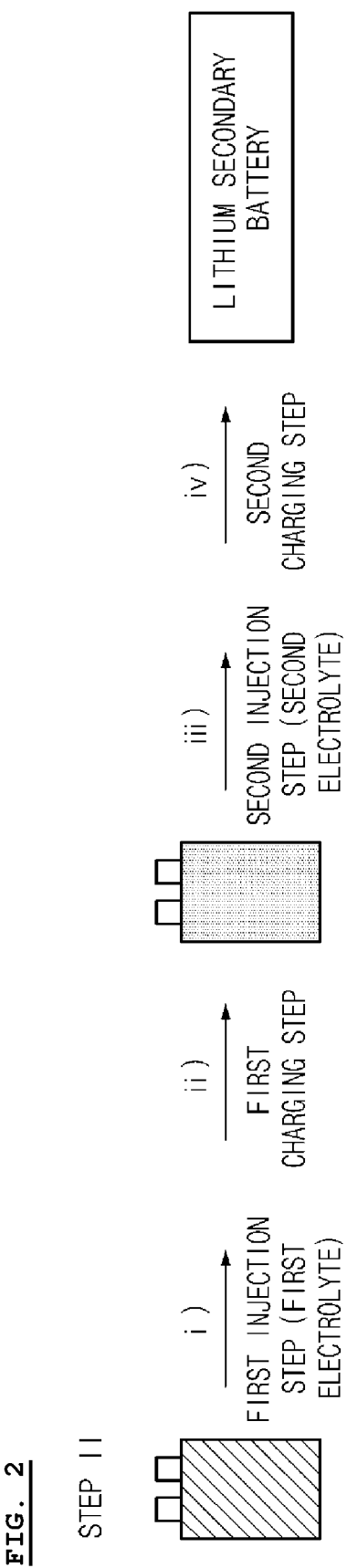
FIG. 2 is a flowchart illustrating an electrode injection and charging step of step II in the method of preparing a lithium secondary battery according to the embodiment of the present invention.

For example, FIG. 2 is a flowchart illustrating step II including the combination process of electrode injection and charging in the method of preparing a lithium secondary battery according to the embodiment of the present invention.

When examined in detail with reference to FIG. 2, in the method of preparing a lithium secondary battery according to the embodiment of the present invention, step II may include the first injection step of injecting the first electrolyte (step i)); the first charging step (step ii)); the second injection step of injecting the second electrolyte (step iii)); and the second charging step (step iv)).

First, the first injection step (step i)) is a step of injecting the first electrolyte into the battery case including the electrode assembly.

The first electrolyte may include the above-described types and amounts of the lithium salt for corrosion protection, the non-aqueous organic solvent, and the additive if necessary.

According to an embodiment of the present invention, an anti-corrosion film may be stably formed on the current collector by using the first electrolyte primarily including the lithium salt for corrosion protection.

Next, the first charging step (step ii)) of step II is a step of primarily charging the battery cell obtained in step i).

According to an embodiment of the present invention, before charging the battery cell after the first injection step of step i), an electrolyte injection hole of the battery case may be clinched by a typical method such as welding or heat fusion, or may not be sealed. In this case, the clinching may denote temporary sealing of the electrolyte injection hole for the injection of the second electrolyte in step iii)).

However, according to an embodiment of the present invention, since gas, such as $CO_2$, is generated due to the decomposition of the organic solvent caused by the electrical reaction, the first charging may be performed in a state in which the electrolyte injection hole is not sealed in order not to adversely affect the performance of the lithium secondary battery by discharging the gas.

The first charging step is a step of activating through the electrical reaction, wherein charging may be performed in a charging voltage range of 1 V to 4.5 V under a constant current condition of 0.01 C to 5 C, particularly, 0.5 C to 3 C, more particularly, 0.2 C to 2 C, and, for example, 0.1 C to 1 C. Also, the charging voltage, for example, may be in a range of 2 V to 4.2 V. Since the first charging step is performed under the above condition, the $AlF_3$ film, the anti-corrosion film, may be stably formed on the current collector.

Next, the second injection step (step iii)) of step II is the second injection step of injecting the second electrolyte into the battery cell including the electrode assembly in which the anti-corrosion film is stably formed in step ii)).

The second electrolyte, like the first electrolyte, may include a lithium salt, a non-aqueous organic solvent, and an additive if necessary.

According to an embodiment of the present invention, the lithium salt included in the second electrolyte is a lithium salt capable of improving the performance of the lithium secondary battery, wherein since the lithium salt may derive the maximum advantage of the lithium salt included in the second electrolyte due to the formation of the anti-corrosion film in step ii)), the output characteristics and the lifetime characteristics of the lithium secondary battery may be simultaneously improved.

The lithium salt included in the second electrolyte is an imide-based lithium salt, wherein the imide-based lithium salt may specifically include lithium bis(fluorosulfonyl)imide (LiFSI), lithium bis(trifluoromethanesulfonyl)imide (LiTFSI), and lithium bis(perfluoroethylsulfonyl)imide (LiBETI), and any one thereof or a mixture of two or more thereof may be used. For example, the imide-based lithium salt may include LiFSI.

The imide salt may increase the output characteristics and the lifetime characteristics because the generation of HF is less than that of $LiPF_6$ and its ionic conductivity is high. However, in the case that the imide salt is used in the electrolyte, corrosion inhibition ability of a metal, for example, an aluminum current collector, may be reduced. Also, in a case in which the film capable of suppressing the corrosion of the electrode is not stably and sufficiently formed, there may be a possibility of further accelerate the corrosion of the aluminum by using the imide-based lithium salt. Accordingly, according to an embodiment of the present invention, as an advantage of the imide-based lithium salt, the output characteristics and lifetime characteristics of the lithium secondary battery may be improved by injecting the second electrolyte including the imide-based lithium salt after the stable formation of the anti-corrosion film on the electrode.

Also, according to an embodiment of the present invention, the same non-aqueous organic solvent and the additive as used in the first electrolyte may be used as the non-aqueous organic solvent and the additive added if necessary which are included in the second electrolyte.

According to an embodiment of the present invention, in the case that the imide-based lithium salt is used in the first electrolyte or the second electrolyte, an amount of propylene carbonate (PC) used in the organic solvent may be increased.

Since the decomposition of the PC is less than that of ethylene carbonate (EC), the PC may be advantageous in terms of the lifetime characteristics or storage characteristics and the reduction of swelling. However, since the PC causes an exfoliation phenomenon to decompose the negative electrode when a typical graphite-based negative electrode is used, there may be a limitation in the amount of the PC within 10 wt %. However, in the case that the imide-based lithium salt is used, the PC may be used in an amount of 30 wt % by forming a protective film on the negative electrode.

According to an embodiment of the present invention, a concentration of the lithium salt in the second electrolyte may be in a range of 0.8 M to 2.5 M, and an amount of the second electrolyte used may be in a range of 30 vol % to 95 vol %, for example, 70 vol % to 90 vol %, based on the total volume of the injected electrolyte.

According to an embodiment of the present invention, since the second electrolyte is injected in a state in which the first electrolyte injected in step i) is present in the battery cell when injecting the second electrolyte, the first electrolyte and the second electrolyte may be mixed.

A mixing ratio in this case may be changed, and a mixing ratio of the first electrolyte to the second electrolyte, for example, may be in a range of 10:90 to 30:70, but the present invention is not limited thereto.

Next, the second charging step (step iv)) in step II is a step of secondarily charging the battery cell, into which the second electrolyte is injected, which is obtained in step iii).

According to an embodiment of the present invention, after the second injection step of step iii), charging may be performed after sealing the electrolyte injection hole of the battery case by a typical method such as welding or heat fusion.

The second charging step is a step of activating through the electrical reaction, wherein charging may be performed in a charging voltage range of 2 V to 4.5 V under a constant current condition of 0.01 C to 5 C, particularly, 0.5 C to 3 C, more particularly, 0.2 C to 2 C, and, for example, 0.1 C to 1 C. For example, the charging voltage may be in a range of 2 V to 4.2 V.

According to an embodiment of the present invention, a state, in which the charging is completed by the second charging step, may denote a first charge completion state.

Also, according to an embodiment of the present invention, in a case in which the electrolyte injection and charging step are performed three times or more, appropriate lithium salt and additive may be selected and used to further improve the output characteristics and lifetime characteristics of the battery, and the present invention is not limited thereto.

The present invention may provide a lithium secondary battery prepared by the method of preparing a lithium secondary battery.

In the lithium secondary battery according to an embodiment of the present invention, a desired film may be formed on an electrode and a current collector by forming an SEI film on the electrode in advance by a pretreatment and performing the stepwise injection of the first electrolyte or the first electrolyte and second electrolyte different from each other into a battery case, which includes the electrode having the SEI film formed thereon, and charging according to the above-described preparation method, and, as a result, the lifetime characteristics and output characteristics of the lithium secondary battery may be further improved.

Specifically, the lithium secondary battery prepared according to the above preparation method may include an electrode in which an SEI film-forming agent derived SEI film; and at least one layer of film formed by an electrochemical oxidation-reduction reaction of the electrolyte are sequentially formed on a surface of the electrode.

Components of the SEI film and the film may be identified by evolved gas analysis (EGA), Fourier transform infrared analysis, two-dimensional nuclear magnetic resonance, X-ray photoelectron spectroscopy, time of flight-secondary-ion mass spectrometry (TOF-SIMS), and scanning electron microscopy.

For example, in a case in which vinylene carbonate is used as the SEI film-forming agent, an SEI film, which includes polymer species including poly(vinylene carbonate), vinylene carbonate-based oligomers, a ring-open polymer of vinylene carbonate, and polyacetylene; and reduction products of vinylene carbonate including lithium vinylene dicarbonate ($CHOCO_2Li$), lithium divinylene dicarboante ($CH=CHOCO_2Li$), lithium divinylene dialkoxide ($CH=CHOLi$), and lithium carboxylate ($RCOOLi$, R is hydrogen or an alkyl group), may be formed.

Also, the lithium secondary battery may include two or more layers of different types of films, which are derived from an additive added in the electrolyte, with the SEI film by controlling the type of the additive in the electrolyte which is injected for each step during the preparation of the battery.

Specifically, in a case in which the SEI film-forming agent includes a cyclic carbonate-based compound containing an unsaturated bond and the first electrolyte includes a sulfonic acid ester-based additive during the preparation of the lithium secondary battery, the lithium secondary battery may include an electrode in which an SEI film derived from the cyclic carbonate-based compound containing an unsaturated bond; and a sulfonic acid ester-based additive derived film are sequentially formed. Also, in this case, when the first electrolyte includes an additive for corrosion protection, an $AlF_3$ film, as an anti-corrosion film, may be formed on the current collector of the electrode.

Furthermore, in a case in which the SEI film-forming agent includes a cyclic carbonate-based compound containing an unsaturated bond, the first electrolyte includes a sulfonic acid ester-based additive, and the second electrolyte includes an imide-based lithium salt during the preparation of the lithium secondary battery, the lithium secondary battery may include an electrode in which an SEI film derived from the cyclic carbonate-based compound containing an unsaturated bond; a sulfonic acid ester-based additive derived film; and an imide-based lithium salt derived film are sequentially formed.

As described above, the lithium secondary battery according to the embodiment of the present invention may further improve the lifetime characteristics and output characteristics of the lithium secondary battery by further forming the desired film on the SEI film which is sufficiently formed. Thus, the lithium secondary battery is suitable for portable devices, such as mobile phones, notebook computers, and digital cameras, and electric cars such as hybrid electric vehicles (HEVs).

According to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

Step I: Pretreatment Step
<Preparation of Electrode>

A composition for forming a positive electrode was prepared by adding 96 wt % of $Li(Ni_{0.33}Co_{0.33}Mn_{0.33})O_2$ as a positive electrode active material, 2 wt % of carbon black as a conductive agent, and 2 wt % of polyvinylidene fluoride (PVdF) as a binder to N-methyl-2-pyrrolidone (NMP) as a solvent. A 20 μm thick aluminum (Al) thin film as a positive electrode collector was coated with the composition for forming a positive electrode and dried, and the Al thin film was then roll-pressed to prepare a positive electrode.

Also, a composition for forming a negative electrode was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film as a negative electrode collector was coated with the composition for forming a negative electrode and dried, and the Cu thin film was then roll-pressed to prepare a negative electrode.

<Preparation of Composition for Forming SEI Film>

A composition for forming an SEI film was prepared by adding $LiPF_6$, as a lithium salt, at a concentration of 1.0 M to a non-aqueous organic solvent having a composition, in which a volume ratio of ethylene carbonate (EC):ethylmethyl carbonate (EMC):dimethyl carbonate (DMC) was 3:3:4, and then adding 1 wt % of vinylene carbonate (VC) based on a total weight of the composition for forming an SEI film.

<Pretreatment Step: SEI Film Forming Step>

The composition for forming an SEI film and negative electrode thus prepared were put in a 15 mL bath and an electrochemical reaction was then performed using a lithium metal foil as a counter electrode. For the electrochemical reaction, a constant current of 0.05 C was applied to the negative electrode and the counter electrode within a voltage range of 2.5 V to 0.005 V, and, when the voltage was 0.005 V, an SEI film was formed on the negative electrode by applying a current under a constant voltage condition until a current value became 1/20 C.

Step II: Electrolyte Injection and Charging Step (Twice Injection)

Step i) First Electrolyte Injection Step
<Preparation of First Electrolyte>

A first electrolyte was prepared by adding 0.25 ml of 1M $LiPF_6$, as a lithium salt, and 1 wt % of 1,3-propane sultone (PS), as an additive, based on a total weight of a non-aqueous electrolyte solution to a non-aqueous organic solvent having a composition in which a volume ratio of propylene carbonate (PC):ethylene carbonate (EC):ethylmethyl carbonate (EMC) was 3:3:4.

<First Electrolyte Injection Step>

An electrode assembly was prepared by disposing a separator formed of three layers of polypropylene/polyethylene/polypropylene (PP/PE/PP) between the positive electrode prepared in step I and the negative electrode having the SEI film formed thereon, the electrode assembly was put in a battery case, and the first electrolyte was then injected.

Step ii) First Charging Step

As a first charging process, first charging was performed at a constant current of 0.1 C up to 4.2 V in a state in which an electrolyte injection hole of the battery case obtained in step i) was not sealed.

Step iii) Second Electrolyte Injection Step
<Preparation of Second Electrolyte>

A second electrolyte was prepared by adding 0.25 ml of 1M LiFSI, as a lithium salt, based on the total weight of the non-aqueous electrolyte solution to a non-aqueous organic solvent having a composition, in which a volume ratio of propylene carbonate (PC):ethylene carbonate (EC):ethylmethyl carbonate (EMC) was 3:3:4, and the second electrolyte was then injected into the electrode assembly first charged in step ii).

Step iv) Second Charging Step

An electrolyte injection hole of the battery case obtained in step iii) was sealed, and, as a second charging process, second charging was then performed at a constant current of 0.2 C up to 4.2 V.

Example 2

A lithium secondary battery was prepared in the same manner as in Example 1 except that the electrolyte injection and charging step of step II in Example 1 was performed only one time as follows:

Step II: Electrolyte Injection and Charging Step (Single Injection)

Step i) First Electrolyte Injection Step
<Preparation of First Electrolyte>

A first electrolyte was prepared by adding 0.5 ml of 1M $LiPF_6$, as a lithium salt, and 1 wt % of 1,3-propane sultone (PS), as an additive, based on a total weight of a non-aqueous electrolyte solution to a non-aqueous organic solvent having a composition in which a volume ratio of propylene carbonate (PC):ethylene carbonate (EC):ethylmethyl carbonate (EMC) was 3:3:4.

<First Electrolyte Injection Step>

An electrode assembly was prepared by disposing a separator formed of three layers of polypropylene/polyethylene/polypropylene (PP/PE/PP) between the positive electrode prepared in step I and the negative electrode having the SEI film formed thereon, the electrode assembly was put in a battery case, and the first electrolyte was then injected.

Step ii) First Charging Step

As a first charging process, first charging was performed at a constant current of 0.1 C up to 4.2 V in a state in which an electrolyte injection hole of the battery case obtained in step i) was not sealed.

Examples 3 to 8

Lithium secondary batteries were prepared in the same manner as in Example 1 except that compositions for forming an SEI film and first and/or second electrolytes were prepared according to formulations listed in the following Table 1 and used.

Comparative Example 1 i) Electrolyte Injection Step
<Preparation of Electrolyte>

An electrolyte was prepared by adding a total of 0.5 ml of 0.5M $LiPF_6$ and 0.5 M LiFSI, as a lithium salt, based on a total weight of a non-aqueous electrolyte solution to a non-aqueous organic solvent having a composition in which a volume ratio of propylene carbonate (PC):ethylene carbonate (EC):ethylmethyl carbonate (EMC) was 3:3:4.

<Preparation of Lithium Secondary Battery>

A composition for forming a positive electrode was prepared by adding 96 wt % of Li(Ni$_{0.33}$Co$_{0.33}$Mn$_{0.33}$)O$_2$ as a positive electrode active material, 2 wt % of carbon black as a conductive agent, and 2 wt % of polyvinylidene fluoride (PVdF) as a binder to N-methyl-2-pyrrolidone (NMP) as a solvent. A 20 μm thick aluminum (Al) thin film as a positive electrode collector was coated with the composition for forming a positive electrode and dried, and the Al thin film was then roll-pressed to prepare a positive electrode.

Also, a composition for forming a negative electrode was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film as a negative electrode collector was coated with the composition for forming a negative electrode and dried, and the Cu thin film was then roll-pressed to prepare a negative electrode.

An electrode assembly was prepared by disposing a separator formed of three layers of polypropylene/polyethylene/polypropylene (PP/PE/PP) between the positive electrode and negative electrode thus prepared, the electrode assembly was put in a battery case, and the electrolyte was then injected.

ii) Charging Step

An electrolyte injection hole of the battery case obtained in step i) was sealed, and, as a first charging process, charging was then performed at a constant current of 0.1 C up to 4.2 V.

Comparative Example 2

Step i) First Electrolyte Injection Step

<Preparation of First Electrolyte>

A first electrolyte was prepared by adding 0.25 ml of 1M LiPF$_6$, as a lithium salt, and 1 wt % of 1,3-propane sultone (PS), as an additive, based on a total weight of a non-aqueous electrolyte solution to a non-aqueous organic solvent having a composition in which a volume ratio of propylene carbonate (PC):ethylene carbonate (EC):ethylmethyl carbonate (EMC) was 3:3:4.

<First Electrolyte Injection Step>

An electrode assembly was prepared by disposing a separator formed of three layers of polypropylene/polyethylene/polypropylene (PP/PE/PP) between the positive electrode and negative electrode prepared in Comparative Example 1, the electrode assembly was put in a battery case, and the first electrolyte was then injected.

Step ii) First Charging Step

As a first charging process, first charging was performed at a constant current of 0.1 C up to 4.2 V in a state in which an electrolyte injection hole of the battery case obtained in step i) was not sealed.

Step iii) Second Electrolyte Injection Step

<Preparation of Second Electrolyte>

A second electrolyte was prepared by adding 0.25 ml of 1M LiFSI, as a lithium salt, based on the total weight of the non-aqueous electrolyte solution to a non-aqueous organic solvent having a composition, in which a volume ratio of propylene carbonate (PC):ethylene carbonate (EC):ethylmethyl carbonate (EMC) was 3:3:4, and the second electrolyte was then injected into the electrode assembly first charged in step ii).

Step iv) Second Charging Step

An electrolyte injection hole of the battery case obtained in step iii) was sealed, and, as a second charging process, second charging was then performed at a constant current of 0.2 C up to 4.2 V.

Comparative Example 3

A lithium secondary battery was prepared in the same manner as in Comparative Example 2 except that, in the method of preparing the lithium secondary battery of Comparative Example 2, LiFSI, instead of LiPF$_6$, was used as a lithium salt during the preparation of the first electrolyte, LiPF$_6$, instead of LiFSI, was used as a lithium salt during the preparation of the second electrolyte, and 1,3-propane sultone (PS) was further used as an additive.

Comparative Example 4

A lithium secondary battery was prepared in the same manner as in Comparative Example 1 except that, in the method of preparing the lithium secondary battery of Comparative Example 1, an electrolyte, which was prepared by adding 0.5 ml of 1M LiPF$_6$, as a lithium salt, and 1 wt % of 1,3-propane sultone (PS) and 1 wt % of vinylene carbonate (VC), as an additive, based on a total weight of a non-aqueous electrolyte solution to a non-aqueous organic solvent having a composition in which a volume ratio of propylene carbonate (PC):ethylene carbonate (EC):ethylmethyl carbonate (EMC) was 3:3:4, was used.

Comparative Example 5

A lithium secondary battery was prepared in the same manner as in Comparative Example 3 except that, in the method of preparing the lithium secondary battery of Comparative Example 3, an electrolyte, which was prepared by adding 0.5 ml of 1M LiPF$_6$, as a lithium salt, and 1 wt % of vinylene carbonate (VC), as an additive, based on a total weight of a non-aqueous electrolyte solution to a non-aqueous organic solvent having a composition in which a volume ratio of propylene carbonate (PC):ethylene carbonate (EC):ethylmethyl carbonate (EMC) was 3:3:4, was used.

The compositions for forming an SEI film and the compositions of the first and second electrolytes, which were used in Examples 1 to 8 and Comparative Examples 1 to 5, are listed in the following Table 1.

TABLE 1

| | Composition for forming a negative electrode SEI film | First electrolyte | Second electrolyte |
| --- | --- | --- | --- |
| Example 1 | ○ (Composition A) | ○ (PC/EC/EMC = 3/3/4, LiPF$_6$ 1M, PS 1 wt %) | ○ (PC/EC/EMC = 3/3/4, LiFSI 1M) |
| Example 2 | ○ (Composition A) | ○ (PC/EC/EMC = 3/3/4, LiPF$_6$ 1M, PS 1 wt %) | x |
| Example 3 | ○ (Composition B) | ○ (PC/EC/EMC = 3/3/4, LiPF$_6$ 1M, PS 1 wt %) | ○ (PC/EC/EMC = 3/3/4, LiFSI 1M) |

TABLE 1-continued

| | Composition for forming a negative electrode SEI film | First electrolyte | Second electrolyte |
|---|---|---|---|
| Example 4 | ○ (Composition C) | ○ (PC/EC/EMC = 3/3/4, LiPF$_6$ 1M, PS 1 wt %) | x |
| Example 5 | ○ (Composition D) | ○ (PC/EC/EMC = 3/3/4, LiPF$_6$ 1M, PS 1 wt %) | ○ (PC/EC/EMC = 3/3/4, LiFSI 1M) |
| Example 6 | ○ (Composition E) | ○ (PC/EC/EMC = 3/3/4, LiPF$_6$ 1M, PS 1 wt %) | x |
| Example 7 | ○ (Composition F) | ○ (PC/EC/EMC = 3/3/4, LiPF$_6$ 1M, PS 1 wt %) | ○ (PC/EC/EMC = 3/3/4, LiFSI 1M) |
| Example 8 | ○ (Composition G) | ○ (PC/EC/EMC = 3/3/4, LiPF$_6$ 1M, PS 1 wt %) | x |
| Comparative Example 1 | x | ○ (PC/EC/EMC = 3/3/4, LiPF$_6$ 0.5M, LiFSI 0.5M) | x |
| Comparative Example 2 | x | ○ (PC/EC/EMC = 3/3/4, LiPF$_6$ 1M, PS 1 wt %) | ○ (PC/EC/EMC = 3/3/4, LiFSI 1M) |
| Comparative Example 3 | x | ○ (PC/EC/EMC = 3/3/4, LiPF$_6$ 1M, LiFSI 1M) | ○ (PC/EC/EMC = 3/3/4, LiPF$_6$ 1M, PS 1 wt %) |
| Comparative Example 4 | x | ○ (PC/EC/EMC = 3/3/4, LiPF$_6$ 1M, PS 1 wt %, VC 1 wt %) | x |
| Comparative Example 5 | x | ○ (EC/EMC/DMC = 3/3/4, LiPF$_6$ 1M, VC 1 wt %) | ○ (PC/EC/EMC = 3/3/4, LiPF$_6$ 1M, PS 1 wt %) |

In Table 1, the mixing ratio of the solvents was based on a volume ratio, and

Composition A: EC/EMC/DMC=3/3/4, LiPF$_6$ 1 M, VC 1 wt %;

Composition B: EC/EMC/DMC=3/3/4, LiPF$_6$ 1 M, FEC 1 wt %;

Composition C: EC/EMC/DMC=3/3/4, LiPF$_6$ 0.9 M, LiODFB 0.1 M;

Composition D: EC/EMC/DMC=3/3/4, LiPF$_6$ 0.9 M, LiFSI 0.1 M;

Composition E: EC/EMC/DMC=3/3/4, LiPF$_6$ 0.9 M, LiF$_2$O$_2$P 0.1 M;

Composition F: EC/EMC/DMC=3/3/4, LiPF$_6$ 1 M, pyrimidine 0.5 wt %; and

Composition G: EC/EMC/DMC=3/3/4, LiPF$_6$ 1 M, PS 0.5 wt %.

Experimental Example 1: Output Characteristics Test

Outputs were calculated from voltage differences which were obtained by discharging the lithium secondary batteries of Examples 1 and 2 and Comparative Examples 1 and 4 at 0.5 C for 10 seconds for the state of charge (SOC) at room temperature. The results thereof are presented in FIG. 3.

Figure 3:
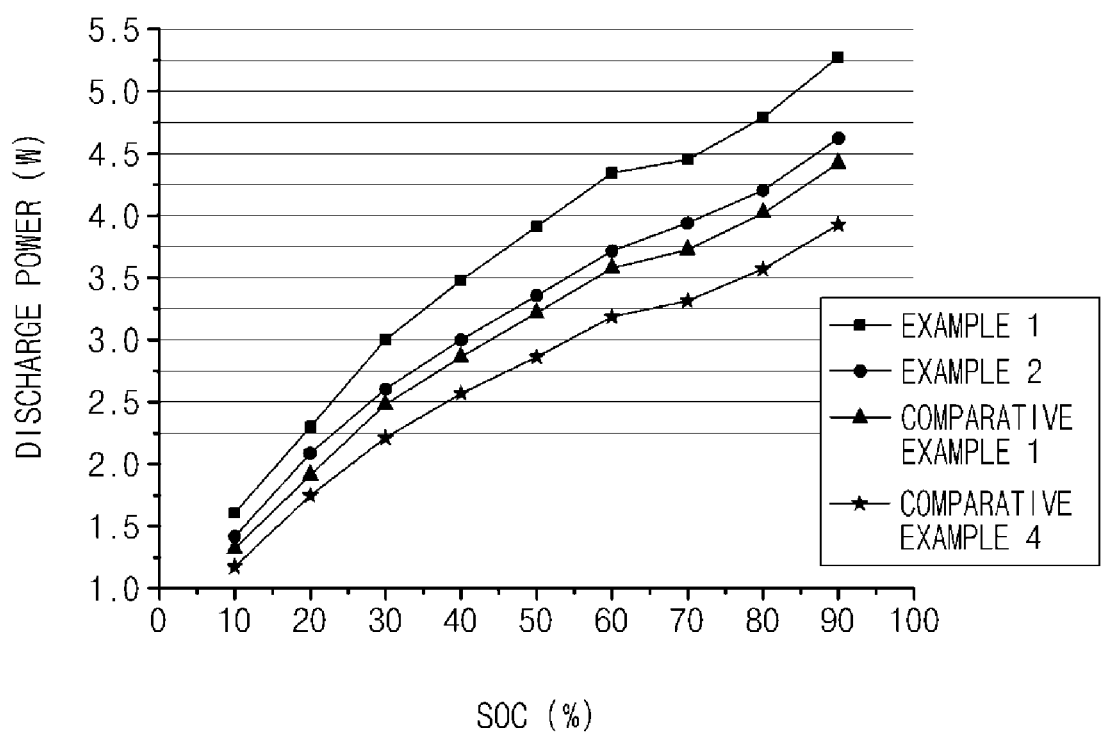
FIG. 3 is a graph illustrating experimental results of output characteristics of lithium secondary batteries prepared in Examples 1 and 2 and Comparative Examples 1 and 4.

As illustrated in FIG. 3, output characteristics of the lithium secondary batteries of Examples 1 and 2 subjected to the pretreatment step of forming an SEI film on the electrode were significantly improved in comparison to those of the lithium secondary batteries of Comparative Examples 1 and 4 which were not subjected to the pretreatment step of forming an SEI film.

Specifically, with respect to Example 1 in which the electrolyte injection and charging step was performed twice while performing the pretreatment step of forming an SEI film on the electrode, it may be understood that the output characteristics were improved by about 15% to about 70% at 90% SOC in comparison to those of Comparative Examples 1 and 4.

Also, when comparing Example 2 and Comparative Example 4, it may be understood that the output characteristics of Comparative Example 4, which was not subjected to the pretreatment step of forming an SEI film on the electrode, were decreased by about 15% to about 20% in comparison to those of Example 2.

Thus, it may be understood that the output characteristics were significantly improved when the pretreatment step of forming an SEI film on the electrode was performed before the electrolyte injection and charging step.

Experimental Example 2: Lifetime Characteristics Test

The lithium secondary batteries of Examples 1 to 5 and Comparative Examples 1 to 4 were charged at 1 C to 4.2 V/3.25 mA at room temperature under a constant current/constant voltage (CC/CV) condition and then discharged at a constant current (CC) of 3 C to a voltage of 3.03 V to measure discharge capacities. The charge and discharge were repeated 1 to 80 cycles and the measured discharge capacities are presented in FIG. 4.

Figure 4:
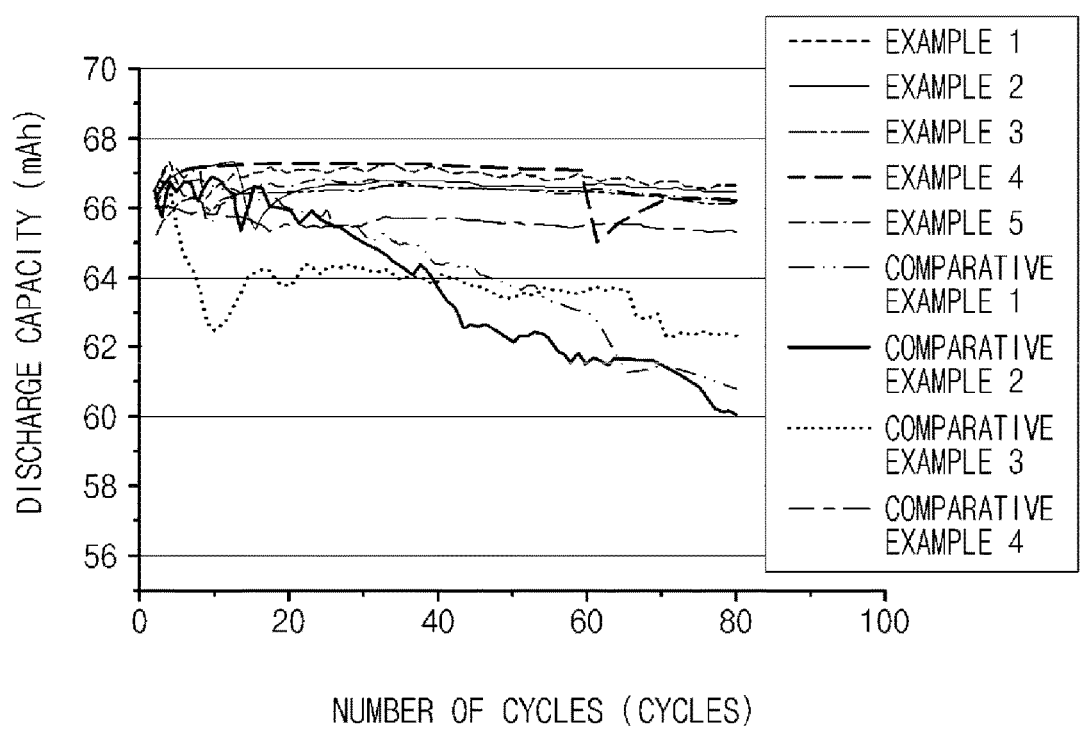
FIG. 4 is a graph illustrating experimental results of lifetime characteristics of lithium secondary batteries prepared in Examples 1 to 5 and Comparative Examples 1 to 4.

As illustrated in FIG. 4, it may be understood that lifetime characteristics of Examples 1 to 5 subjected to the pretreatment step of forming an SEI film on the electrode according to the present invention were significantly improved in comparison to those of the lithium secondary batteries of Comparative Examples 1 to 4 which were not subjected to the pretreatment step.

Specifically, with respect to Example 1 in which the electrolyte injection and charging step was performed one or more times while performing the pretreatment step of forming an SEI film on the electrode, it may be understood that initial discharge capacity was similar to that of Comparative Examples 1 to 4, but discharge capacity after about 10 cycles was significantly improved in comparison to that of Comparative Examples 1 to 4.

That is, with respect to the secondary batteries of Examples 1 to 5, slopes of the resulting graphs of lifetime characteristics from the $1^{st}$ cycle to the $80^{th}$ cycle were slow so that discharge capacities at the $80^{th}$ cycle were hardly decreased from the initial discharge capacities. In contrast, with respect to Comparative Examples 1 to 4, it may be confirmed that discharge capacities were significantly decreased after a $30^{th}$ cycle and lifetime characteristics at the $80^{th}$ cycle were decreased by about 5% to about 15% in comparison to those of Example 1.

Also, when comparing Comparative Examples 1 and 2 in which the electrolyte injection and charging step was performed twice under the same condition, it may be observed that the lifetime characteristics were decreased by about 11% depending on whether the pretreatment step of forming an SEI film on the electrode was performed before the electrolyte injection and charging step or not.

Thus, it may be understood that the lifetime characteristics were significantly improved when the pretreatment step of forming an SEI film on the electrode was performed before the electrolyte injection and charging step.

Experimental Example 3: Swelling Characteristics Test

The lithium secondary batteries of Examples 2 to 8 and Comparative Examples 4 and 5 were charged at 1 C to 4.2 V/3.25 mA at room temperature under a constant current/constant voltage (CC/CV) condition and then put in an oven while the temperature was increased to 85° C. for 1 hour. Then, a thickness of each battery was measured after holding the temperature for 4 hours. Degrees of swelling from initial thicknesses are presented in Table 2.

TABLE 2

| | Degree of swelling (mm) |
|---|---|
| Example 2 | 0.31 |
| Example 3 | 0.25 |
| Example 4 | 0.44 |
| Example 5 | 0.50 |
| Example 6 | 0.36 |
| Example 7 | 0.40 |
| Example 8 | 0.38 |
| Comparative Example 4 | 1.40 |
| Comparative Example 5 | 1.55 |

As illustrated in Table 2, it may be understood that swelling characteristics of Examples 2 to 8 were significantly reduced in comparison to those of Comparative Examples 4 and 5.

As an example, the battery of Example 2 had a degree of swelling of 0.31 nm and the battery of Comparative Example 4 had a degree of swelling of 1.40 nm, wherein it was confirmed that the degree of swelling of the electrode of Example 2 from its initial thickness was reduced by about 351% in comparison to that of Comparative Example 4.

The invention claimed is:

1. A method of preparing a lithium secondary battery, the method comprising:
    performing a pretreatment in which an SEI (solid electrolyte interface) film is formed on an electrode by impregnating the electrode in a composition for forming an SEI film and applying a voltage to the electrode; and
    preparing an electrode assembly using the electrode having the SEI film formed thereon, putting the electrode assembly in a battery case, and performing a combination process of electrolyte injection and charging two or more times,
    wherein the composition for forming an SEI film comprises a lithium salt, a non-aqueous organic solvent, and an SEI film-forming agent forming the SEI film by an electrochemical oxidation or reduction decomposition reaction,
    wherein the combination process of electrolyte injection and charging comprises:
    a first injection step of preparing a battery cell by injecting a first electrolyte into a battery case;
    a first charging step of charging the battery cell;
    a second injection step of injecting a second electrolyte into the charged battery cell; and
    a second charging step of charging the battery cell into which the second electrolyte is injected,
    wherein the second electrolyte comprises an imide-based lithium salt.

2. The method of claim 1, wherein the SEI film-forming agent comprises one selected from the group consisting of a cyclic carbonate-based compound containing an unsaturated bond; a cyclic or chain carbonate-based compound containing a halogen atom; a lithium salt containing an oxalato complex as an anion; an imide-based lithium salt; a fluorophosphate-based lithium salt; a 6-membered aromatic heterocyclic compound containing at least two nitrogen atoms in a molecule; and a sultone-based compound, or a mixture of two or more thereof.

3. The method of claim 1, wherein the SEI film-forming agent is included in an amount of 0.1 wt % to 10 wt % based on a total weight of the composition for forming an SEI film.

4. The method of claim 1, wherein the forming of the SEI film is performed by applying a voltage of 0.005 V to 4.5 V at a constant current of 0.01 C to 5 C.

5. The method of claim 1, wherein the first electrolyte comprises at least one lithium salt selected from the group consisting of $LiPF_6$, $LiAsF_6$, $LiBF_4$, $LiSbF_6$, and $LiSO_3CF_3$,
    the electrode comprises an aluminum current collector, and
    an $AlF_3$ film is formed on the current collector after the first charging step.

6. The method of claim 1, wherein the first electrolyte further comprises a sulfonic acid ester-based additive.

7. The method of claim 1, wherein the first charging step is performed by applying a voltage of 1.0 V to 4.5 V at a constant current of 0.01 C to 5 C.

8. The method of claim 1, wherein the second charging step is performed by applying a voltage of 2.0 V to 4.5 V at a constant current of 0.01 C to 5 C in a state in which the battery case is sealed after the injection of the second electrolyte.

9. The method of claim 1, wherein the SEI film-forming agent comprises a cyclic carbonate-based compound containing an unsaturated bond, and
    the first electrolyte comprises at least one lithium salt selected from the group consisting of $LiPF_6$, $LiAsF_6$, $LiBF_4$, $LiSbF_6$, and $LiSO_3CF_3$.

10. The method of claim 9, wherein the first electrolyte further comprises a sulfonic acid ester-based additive.

11. A lithium secondary battery prepared by the method of claim 1, comprising an electrode including an SEI film derived from a cyclic carbonate-based compound containing an unsaturated bond formed on a surface of the electrode, a sulfonic acid ester-based additive derived film formed on the SEI film, and an imide-based lithium salt derived film formed on the sulfonic acid ester-based additive derived film.

12. A battery module comprising the lithium secondary battery of claim 11 as a unit cell.

13. A battery pack comprising the battery module of claim 12.

* * * * *